(12) United States Patent
Hung et al.

(10) Patent No.: US 12,045,623 B2
(45) Date of Patent: Jul. 23, 2024

(54) SYSTEMS AND METHODS FOR MEMORY CONTENT SHARING BETWEEN HOSTS AND MANAGEMENT CONTROLLERS

(71) Applicant: QUANTA COMPUTER INC., Taoyuan (TW)

(72) Inventors: Ming-Hung Hung, Taoyuan (TW); Shu-Ming Chu, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 79 days.

(21) Appl. No.: 17/695,129

(22) Filed: Mar. 15, 2022

(65) Prior Publication Data

US 2023/0297390 A1 Sep. 21, 2023

(51) Int. Cl.
G06F 9/4401 (2018.01)

(52) U.S. Cl.
CPC .................. G06F 9/4401 (2013.01)

(58) Field of Classification Search
None
See application file for complete search history.

(56) References Cited

U.S. PATENT DOCUMENTS

| | | | | |
|---|---|---|---|---|
| 9,542,195 B1* | 1/2017 | Astarabadi | .......... | G06F 11/1469 |
| 2007/0143611 A1* | 6/2007 | Arroyo | ................... | H04L 63/06 |
| | | | | 713/171 |
| 2011/0258410 A1* | 10/2011 | Lambert | ................. | G06F 21/78 |
| | | | | 713/170 |
| 2012/0102580 A1* | 4/2012 | Bealkowski | ............ | G06F 21/86 |
| | | | | 726/34 |
| 2014/0047224 A1* | 2/2014 | Ayanam | .................. | G06F 8/654 |
| | | | | 713/1 |
| 2015/0154092 A1* | 6/2015 | Chen | ...................... | G06F 9/4401 |
| | | | | 713/2 |
| 2017/0277545 A1* | 9/2017 | Dambal | ................ | G06F 9/4403 |
| 2019/0004826 A1 | 1/2019 | Ryan et al. | | |
| 2020/0042710 A1* | 2/2020 | Liu | ......... | G06F 21/575 |
| 2021/0004242 A1* | 1/2021 | Su | .......... | G06F 9/4416 |

FOREIGN PATENT DOCUMENTS

| | | |
|---|---|---|
| CN | 105404525 A | 3/2016 |
| CN | 106020854 A | 10/2016 |
| CN | 107832087 A | 3/2018 |
| TW | I584196 B | 5/2017 |
| TW | I612474 B | 1/2018 |
| TW | I724415 B | 4/2021 |

OTHER PUBLICATIONS

TW Office Action for Application No. 111124010, mailed Feb. 10, 2023, w/ First Office Action Summary.
TW Search Report for Application No. 111124010, mailed Feb. 10, 2023, w/ First Office Action.

* cited by examiner

*Primary Examiner* — Paul Yen
(74) *Attorney, Agent, or Firm* — NIXON PEABODY LLP

(57) ABSTRACT

A computing system is provided. The computing system a central processing unit (CPU) configured to run a basic input/output system (BIOS) service and an operating system (OS). The computing system further includes a baseboard management controller (BMC) and a first boot non-volatile memory coupled to both the CPU and the BMC. A first portion of the first boot non-volatile memory stores system settings and configuration in an open standard such that the BIOS and the BMC can access the system settings based on a temporal ownership of the first portion of the first boot non-volatile memory.

21 Claims, 13 Drawing Sheets

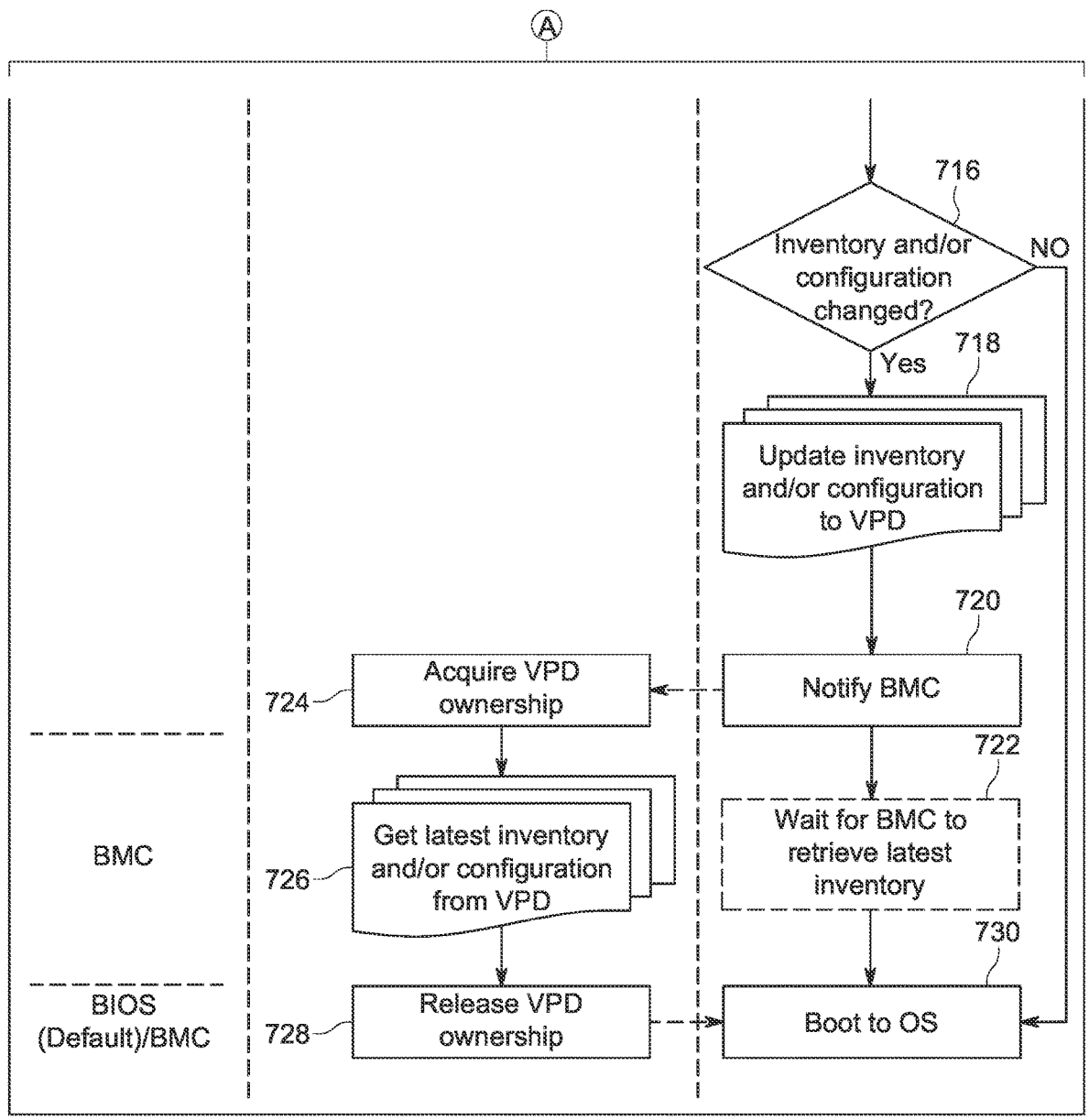
FIG. 7(Continued...)

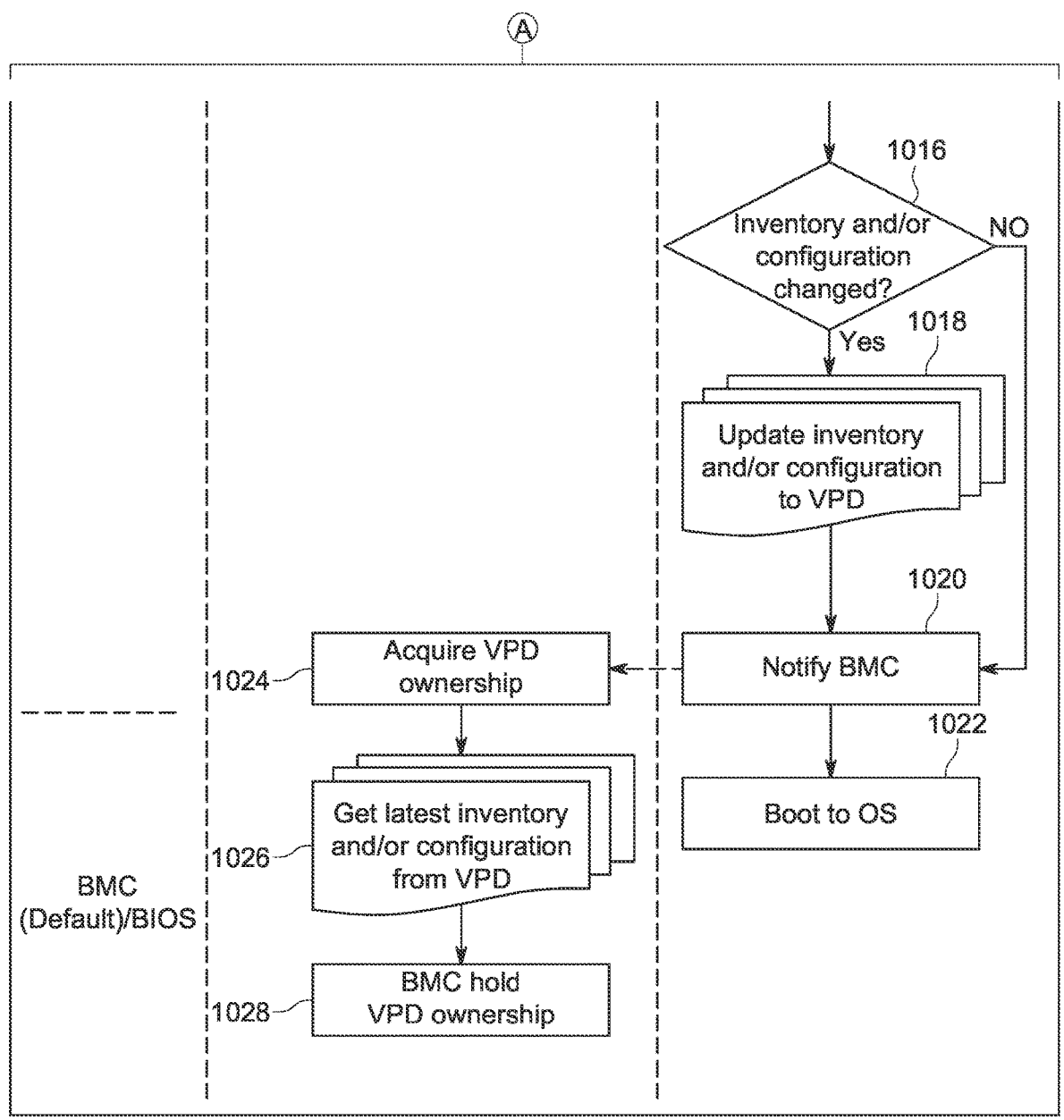
FIG. 10(Continued...)

SYSTEMS AND METHODS FOR MEMORY CONTENT SHARING BETWEEN HOSTS AND MANAGEMENT CONTROLLERS

FIELD OF THE INVENTION

The present invention relates generally to boot management in computing systems, and more specifically, to improving communication and memory sharing between a baseboard management controller (BMC) and a basic input/output system (BIOS).

BACKGROUND OF THE INVENTION

Computing systems (e.g., servers, desktop computers, laptop computers, etc.) are used in different contexts for a wide range of functions. Some computing systems operate on batteries and may require low-power operation to conserve charge on the batteries. On the other hand, some computing systems may be plugged into a power outlet, and low-power operation is not as important as computing performance. Many computing systems balance performance and power consumption, even when plugged into a power outlet. No matter what type of computing system is used, the computing system is typically initialized when powered-up. The process of initializing the computing system is called booting. Each computing system can have a different booting sequence or procedure based on the specific hardware components present in the computing system. Typically, computing systems store booting sequences or procedures in non-volatile memory modules. Controllers and processors present in the computing systems typically have different dedicated non-volatile memory modules for storing boot sequences that involve the controllers and processors. This balkanization of instructions into separate non-volatile memory modules for controllers and processors can result in suboptimal communication of configuration between different controllers and processors in the computing systems. The present disclosure provides systems and methods for solving problems associated with communicating settings between processors and controllers involved in booting computing systems.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a computing system includes a central processing unit (CPU) configured to run a basic input/output system (BIOS) service and an operating system (OS). The computing system further includes a baseboard management controller (BMC) and a first boot non-volatile memory coupled to both the CPU and the BMC. A first portion of the first boot non-volatile memory stores system settings and a configuration in an open standard such that the BIOS and the BMC can access the system settings based on a temporal ownership of the first portion of the first boot non-volatile memory.

In an implementation, the system further includes a multiplexer (MUX) coupled to the boot non-volatile memory, the BMC, and the CPU. The MUX receives a control signal from the BMC for switching access between the CPU and the BMC. In an implementation, the boot non-volatile memory is a serial peripheral interface (SPI) flash. In an implementation, the BIOS is designated as a default owner of the first portion of the first boot non-volatile memory. In an implementation, the BMC requests ownership from the BIOS to access the first portion of the first boot non-volatile memory. In an implementation, the first portion of the first boot non-volatile memory includes a read-only portion and a readable-writable portion. Both the read-only portion and the readable-writable portion are writable by the BMC during runtime, and only the readable-writable portion is writable by the BIOS during runtime. In an implementation, the system further includes a second boot non-volatile memory coupled to the BMC. The second boot non-volatile memory stores backup system settings stored in the first portion of the boot non-volatile memory.

In an implementation, the open standard is vital product data (VPD) or JavaScript Object Notation (JSON). In an implementation, the BMC is designated as a default owner of the first portion of the first boot non-volatile memory. In an implementation, the OS does not have in-band access to the first portion of the first boot non-volatile memory. In an implementation, the OS relies on an intelligent platform management interface (IPMI) communication with the BMC to access the first boot non-volatile memory. In an implementation, the BIOS requests ownership from the BMC to access the first portion of the first boot non-volatile memory.

According to certain aspects of the present disclosure, a computer-implemented method includes booting a baseboard management controller (BMC) of a computing system using system settings from a first portion of a boot non-volatile memory that are stored in an open standard. The boot non-volatile memory is coupled to both the BMC and a central processing unit (CPU) of the computing system. The method further includes receiving, at the BMC, a power-on signal. The method further includes booting, by the CPU, a basic input/output system (BIOS) from the first portion of the boot non-volatile memory. The method further includes notifying, by the BIOS, the BMC of any changes to the system settings. The method further includes switching temporal ownership of the first portion of the first boot non-volatile memory from the BIOS to the BMC so that the BMC obtains the changes to the system settings in the open standard.

In an implementation, the BMC provides a control signal to a multiplexer (MUX) coupled to the boot non-volatile memory, the BMC, and the CPU. The control signal switches the temporal ownership of the first portion of the first boot non-volatile memory from the BIOS to the BMC. In an implementation, the boot non-volatile memory is a serial peripheral interface (SPI) flash. In an implementation, the BIOS is designated as a default owner of the first portion of the first boot non-volatile memory. In an implementation, the BMC requests ownership from the BIOS to access the first portion of the first boot non-volatile memory. In an implementation, the method further includes booting, by the BIOS, an operating system (OS) of the computing system. In an implementation, the OS is booted after the BMC releases the temporal ownership of the first boot non-volatile memory to the BIOS.

According to certain aspects of the present disclosure, a computer-program product is provided. The computer-program product is tangibly embodied in a non-transitory machine-readable storage medium, including instructions configured to cause a data processing apparatus to perform operations. The operations include booting a baseboard management controller (BMC) of a computing system using system settings from a first portion of a boot non-volatile memory that are stored in an open standard. The boot non-volatile memory is coupled to both the BMC and a central processing unit (CPU) of the computing system. The operations further include receiving, at the BMC, a power-on signal. The operations further include booting, by the CPU, a basic input/output system (BIOS) from the first portion of the boot non-volatile memory. The operations further include notifying, by the BIOS, the BMC of any changes to the system settings. The operations further include switching temporal ownership of the first portion of the first boot non-volatile memory from the BIOS to the BMC so that the BMC can obtain the changes to the system settings in the open standard.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Figure 1:
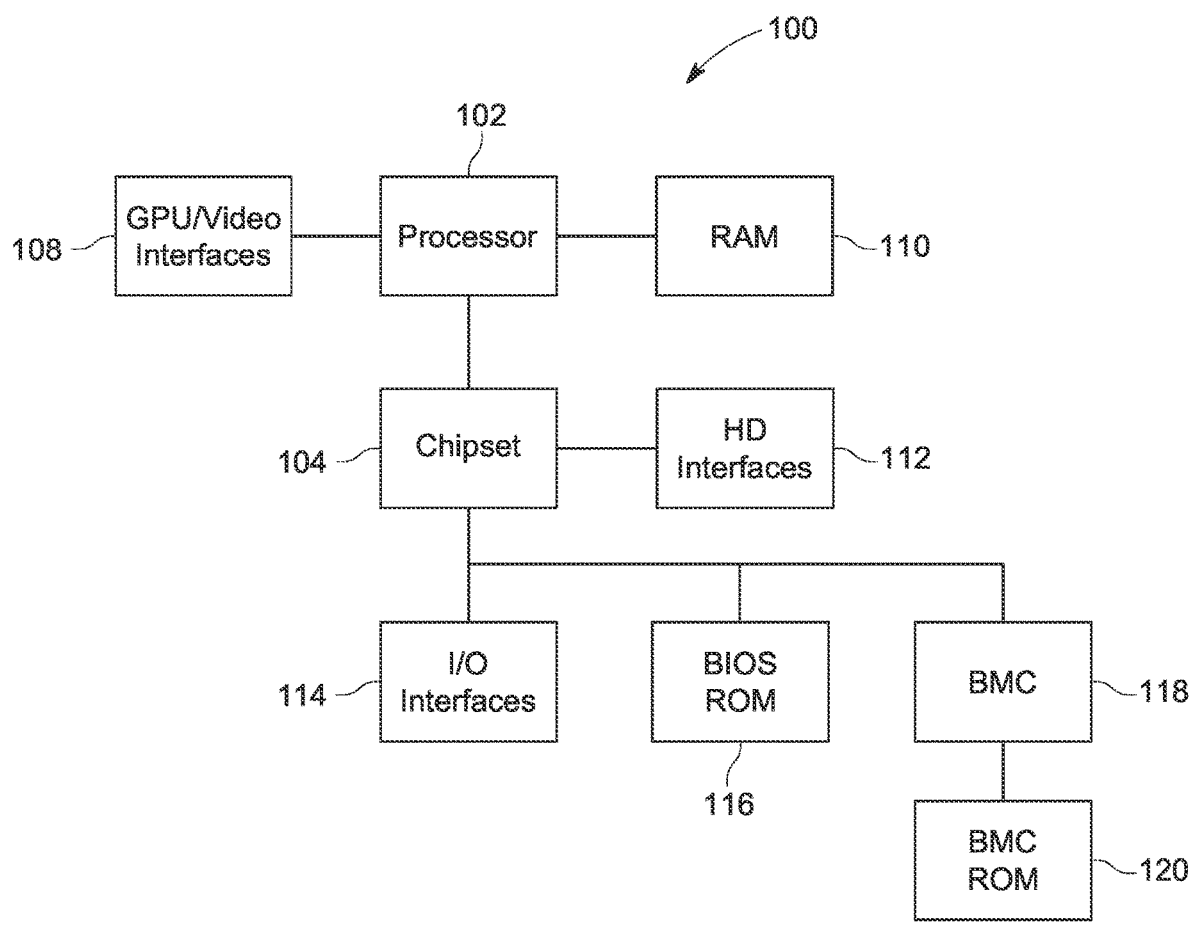
FIG. 1 is a block diagram of a computing system, according to certain aspects of the present disclosure.

In a computing system, a processor (e.g., a central processing unit (CPU)) is typically involved in booting the basic input/output system (BIOS), and a baseboard management controller (BMC) is typically involved in booting the BMC. Since the booting sequence for the BIOS and the BMC are independent of each other, the BMC and the BIOS are typically booted at the same time to reduce the delay associated with initializing the computing system. As such, the computing system is equipped with two non-volatile memory modules (e.g., two flash modules) so that the booting instructions for the BIOS are stored in a first non-volatile memory module, and the booting instructions for the BMC are stored in a second non-volatile memory module. The BMC and the CPU can access their individual non-volatile memory modules. The first and second non-volatile memory modules can store settings, which can be both applicable to the CPU and BMC. For example, the first non-volatile memory module that stores the BIOS can include settings required by the BMC, and the second non-volatile memory module that stores the booting instructions for the BMC can include settings required by the CPU. In conventional computing systems, neither the CPU nor the BMC can easily access each other's non-volatile memory modules. The BMC and CPU typically require different storage formats that are not recognized by each other. Embodiments of the present disclosure provide methods and systems for allowing sharing of settings and configurations stored on any one of the first non-volatile memory module or the second non-volatile memory module with any one of the BMC or the CPU.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Referring to FIG. 1, a block diagram of a computing system 100 is provided. Examples of the computing system 100 include a server, a laptop, a desktop computer, a smartphone, etc. The computing system 100 includes a processor 102, graphics processing unit (GPU)/video interfaces 108, a chipset 104, random access memory (RAM) modules 110, input/output (I/O) interfaces 114, hard disk (HD) interfaces 112, a BIOS read only memory (ROM) 116, a BMC 118, and a BMC ROM 120. Each of the components provided in FIG. 1 can be provided on a circuit board of the computing system 100. The circuit board can be a printed circuit board (PCB) that serves as a communications backbone for all components and external peripherals that connect to the computing system 100. In some examples, the circuit board is a motherboard that includes copper connecting traces and copper planes for power and signal isolation.

Although indicated as singular in FIG. 1, the processor 102 can be one or more processors (e.g., one processor, two processors, three processors, etc.). The processor 102 can include CPUs and GPUs. In some implementations, GPUs are separated from CPUs and communicate with CPUs via the one or more I/O interfaces 114 or the one or more GPU/video interfaces 108. For example, the I/O interfaces 114 include peripheral component interconnect express (PCIe) slots for receiving GPUs, and the CPUs can manage initialization and operation of the GPUs via the PCIe bus standard. The GPUs are coupled to video interfaces that enable the viewing of information on monitors or screens.

The RAM modules 110 can include dual inline memory modules (DIMMs) of double data rate synchronous dynamic random access memory (DDR SDRAM). The RAM modules 110 are high speed volatile memory modules that serve as main memory for the processor 102. The main memory for the processor 102 is used when cache memory or register memory of the processor 102 does not include information that the processor 102 needs. The RAM modules 110 are higher capacity memory when compared to the cache memory or register memory of the processor 102.

The BIOS ROM 116 and the BMC ROM 120 are provided in order to facilitate initialization of components of the computing system 100. The BIOS ROM 116 can be a BIOS non-volatile memory (e.g., a flash memory) including instructions, settings, and/or configurations for the processor 102 (e.g., a CPU) to booting both the BIOS program that initializes components of the computing system 100. Similarly, the BMC ROM 120 can be a non-volatile memory, including instructions, settings, and/or configurations for the BMC 118 to initialize the computing system 100. In some implementations, the BIOS ROM 116 and the BMC ROM 120 are serial peripheral interface (SPI) flash memories.

The BIOS ROM 116 contains a BIOS image. The BIOS image is a configuration file that includes instructions for basic setup of the computing system 100. The BIOS image includes a power-on self-test (POST) function, a bootstrap loader function, load BIOS drivers function, and/or BIOS configuration setup. The POST function is an initial test of computer hardware to ensure errors do not exist before loading of an operating system of the computing system 100. The bootstrap loader function locates the operating system on the computing system 100, and in some implementations, can pass control to the operating system once the BIOS setup is complete. The load BIOS drivers function involves executing low-level drivers to provide basic operational control over some hardware components of the computing system 100. In some cases, these hardware components include peripheral devices like mice, keyboards, or other input devices. The BIOS configuration setup is a program that allows configuring hardware settings (e.g., date and time). The BMC ROM 120 includes a BMC image. The BMC image includes an embedded operating system, an application for management function, space configurations concerning saving BMC log and configuration data, etc. The BMC image facilitates booting the BMC 118.

The BMC 118 is a specialized controller (or processor) for managing operations of the computing system 100. In some implementations, the BMC 118 enables remote monitoring of the computing system 100, having communication channels to different components of the computing system 100. For example, the BMC 118 can allow remote monitoring of fan speeds, temperature sensors, hard drive faults, power supply failures, operating system faults, etc. The BMC 118 can include internal temporary cache memory that facilitates the BMC 118 processing of machine readable instructions. Example BMCs include ASPEED AST2300, AST2400, AST2500, AST2600, etc.

In some implementations, the BMC 118 is connected to various general purpose input/output (GPIO) pins. For example, the BMC 118 can be connected to a first GPIO pin for a system reset (e.g., an input that resets the computing system 100). The BMC 118 can be connected to a second GPIO pin for a chipset reset (e.g., an output that resets and initiates booting from the BIOS image). The BMC 118 can be connected to a third GPIO pin for power on (i.e., an input pin for turning on the computing system 100). The BMC 118 can be connected to a fourth GPIO pin for a power controller to manage power provision to different parts of the computing system 100. By routing power on and system reset signals through the BMC 118, the BMC 118 can capture these inputs, using them to control behavior of the computing system 100 when the computing system 100 is powered on or reset.

The one or more I/O interfaces 114 can include serial advanced technology attachment (SATA) ports to connect bus adapters to storage devices such as hard disk drives, solid state drives, optical drives, etc. The I/O interfaces 114 can include more PCI or PCIe ports for receiving cards such as Ethernet cards, Wi-Fi cards, Bluetooth cards, sound cards, etc. The I/O interfaces 114 can include universal serial bus (USB) ports to connect peripheral devices or mass storage devices.

The chipset 104 is a chip that is directly connected to the processor and provides access to components that communicate at a slower speed compared to the other components connected to the processor 102 (e.g., the GPU/video interfaces 108 and the RAM modules 110). For example, the chipset 104 can connect the HD interfaces 112, the I/O interfaces 114, the BIOS ROM 116, the BMC 118, etc. The HD interfaces 112 can include serial advanced technology attachment (SATA), integrated drive electronics (IDE), peripheral component interconnect (PCI) interface, etc. Although illustrated as separate components, in some implementations, the computing system 100 includes a system on a chip that provides functionality of the processor 102 and the chipset 104, and/or the I/O interfaces 114.

Figure 2A:
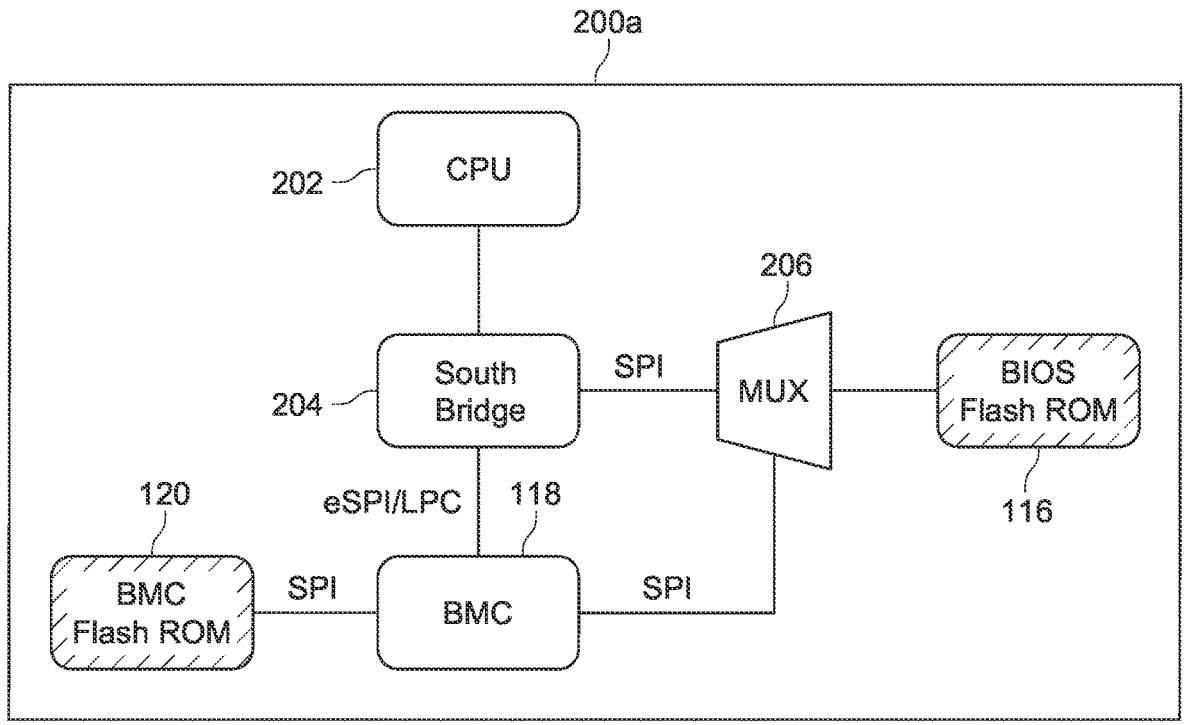
FIG. 2A is a simplified block diagram for accessing boot memory of a first computing system, according to certain aspects of the present disclosure.

Referring to FIG. 2A, a simplified block diagram showing components of a communication path in a computing system 200a for accessing non-volatile memory modules is provided, according to certain aspects of the present disclosure. The computing system 200a is similar to or the same as the computing system 100 (FIG. 1). The computing system 200a includes a CPU 202, analogous to the processor 102. The computing system 200a includes a southbridge 204, analogous to the chipset 104. The computing system 200a includes the BMC 118 and non-volatile memory modules indicated as the BIOS ROM 116 and the BMC ROM 120. The BIOS ROM 116 and the BMC ROM 120 can be flash ROMs. The computing system 200a includes a multiplexer (MUX) 206 for allowing the BMC 118 and the CPU 202 to access the BIOS ROM 116. The CPU 202 can communicate with the BMC 118 for specific access to the BMC ROM 120. SPI interface and/or enhanced SPI (eSPI) interface can be used as the communications interface for accessing the non-volatile memory modules. In some implementations, low pin count (LPC) interface can be used for communication between the BMC 118 and the southbridge 204.

Figure 2B:
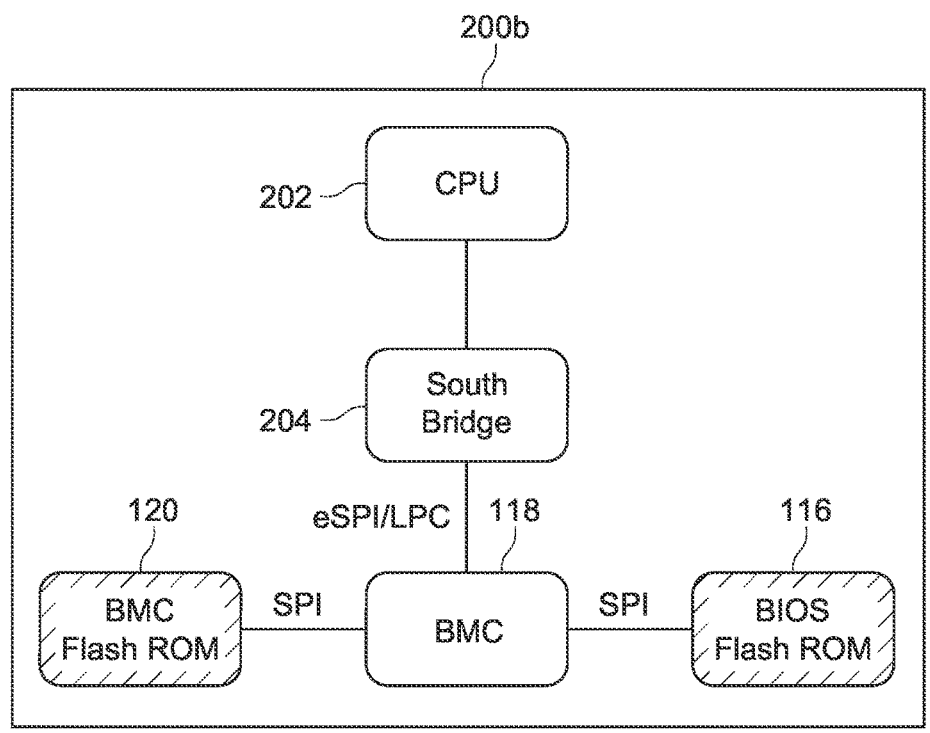
FIG. 2B is a simplified block diagram for accessing boot memory of a second computing system, according to certain aspects of the present disclosure.

Referring to FIG. 2B, a simplified block diagram showing components of a communication path in a computing system 200b for accessing non-volatile memory modules is provided, according to certain aspects of the present disclosure. In comparison to FIG. 2A, FIG. 2B does not include the MUX 206, and the BMC 118 serves as the conduit for the CPU 202 when accessing the BIOS ROM 116.

During Power On Self-Test (POST) stage of a booting process of a computing system (e.g., the computing system 100, 200a, 200b), the host firmware such as BIOS sends system configuration and inventory to the BMC 118. BIOS here indicates the program stored in the BIOS ROM 116 that is run on the CPU 202 to initialize the computing system 200a. By having the BMC 118 receive system configuration and inventory from the host firmware, a user of the computing system 200a or 200b is able to obtain system configuration and inventory remotely. Remote access to system configuration and inventory indicates that the user is able to configure system settings remotely. During runtime, the BIOS can record a system event log (SEL) to the BMC ROM 120 if any error detected. In order to perform this task, the BIOS relies on low-speed interfaces or protocols such as Intelligent Platform Management Interface (IPMI) Keyboard Control Style (KCS) running on eSPI or LPC interface to communicate with the BMC 118. This communication process between the BIOS and BMC and having the BIOS rely on low-speed interfaces takes time and impacts system boot time, thus negatively impacting performance of the computing system 200a or 200b.

Figure 3:
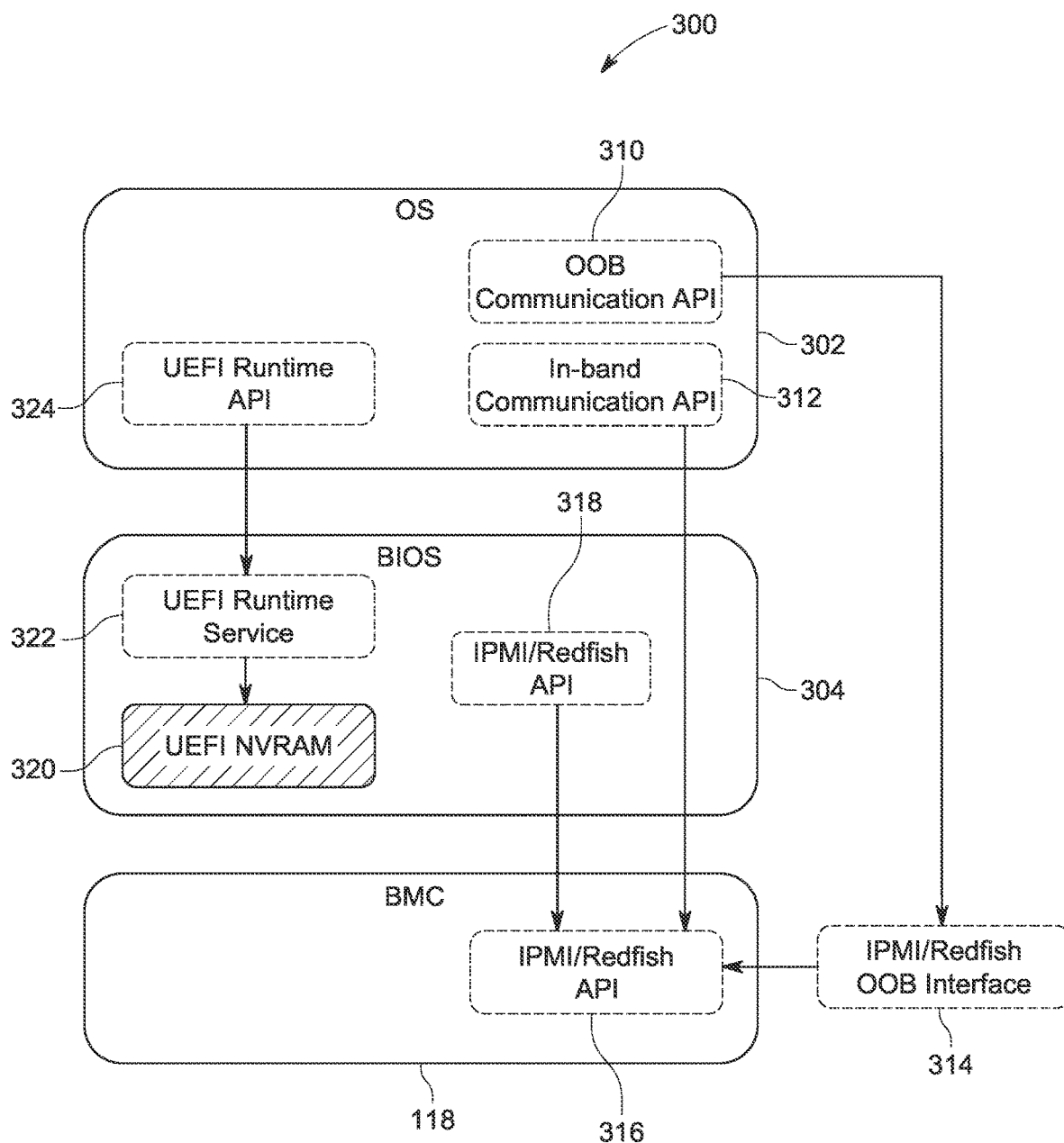
FIG. 3 is a block diagram illustrating an application layer architecture of a computing systems in the prior art.

FIG. 3 is a block diagram illustrating an application layer architecture 300 of a computing system in the prior art. FIG. 3 further illustrates application programming interfaces (APIs) that enable communication between components of the application layer architecture 300. The application layer architecture 300 includes an operating system (OS) 302, a BIOS 304, and the BMC 118. The OS 302 and the BIOS 304 are environments run by a processor (e.g., the processor 102 of FIG. 1 or the CPU 202 of FIGS. 2A and 2B). The BIOS 304 is an environment that is typically loaded at the beginning of a booting the computing system, and the OS 302 is an environment that is typically loaded once the BIOS 304 is finished performing its tasks, indicating that the hardware components of the computing system are functioning properly to load the OS 302.

In conventional systems, the BIOS 304 manages a Unified Extensible Firmware Interface (UEFI) non-volatile random access memory (NVRAM) 320. The UEFI NVRAM 320 stores settings and configurations and are the same or similar to the BIOS ROM 116 of FIGS. 2A and 2B. The OS can access the UEFI NVRAM 320 to make changes through a UEFI runtime API 324 running on the OS that communicates with a UEFI runtime service 322 running on the BIOS 304. The BIOS 304 can communicate with the BMC 118 using IPMI/Redfish API 318 running on the BIOS 304, which communicates with IPMI/Redfish API 316 running on the BMC 118. Similarly, the OS 302 can communicate with the BMC 118 through out-of-band (OOB) communication API 310 running on the OS 302 through the IPMI/Redfish OOB interface 314. The OS 302 can also communicate with the BMC 118 using in-band communication API 312.

Figure 4:
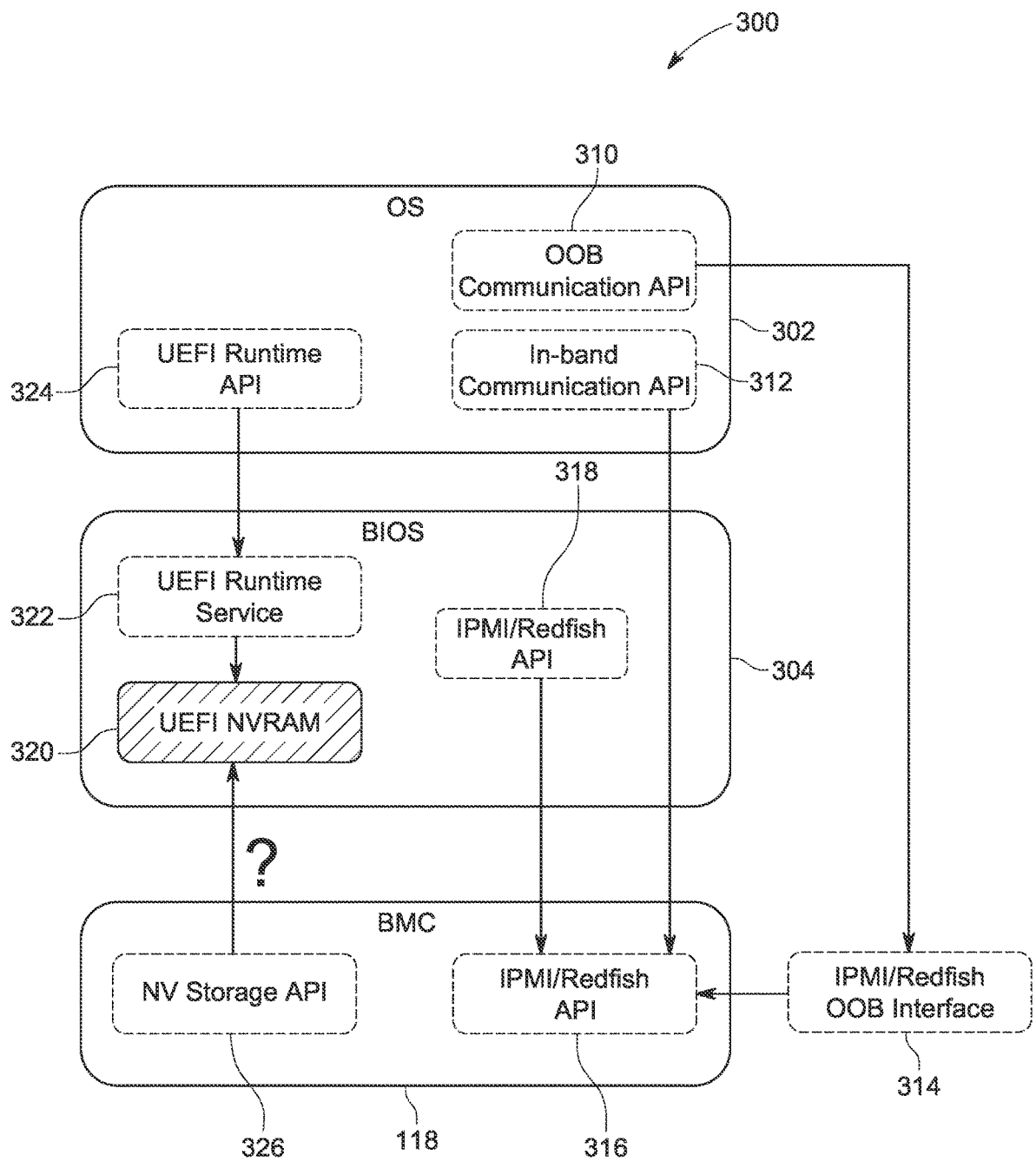
FIG. 4 is a block diagram illustrating an issue with the application layer architecture of FIG. 3.

FIG. 4 illustrates an issue present in the application layer architecture 300 of the prior art. The different APIs illustrated in FIGS. 3 and 4 indicate conversions for communicating information between the BIOS 304 and the BMC 118 and the OS 302 and the BMC 118. When the BMC 118 wants to access settings in the UEFI NVRAM 320, the BMC 118 does not understand the format of the UEFI NVRAM 320. That is, the BMC 118 does not have an appropriate API like an NV Storage API 326 running on the BMC 118 that can access the UEFI NVRAM 320 directly. The BIOS 304 needs to translate the settings and configurations stored in the UEFI NVRAM 320 to IPMI/Redfish API 318 in order to communicate the settings and configurations to the BMC 118. By having the BIOS 304 perform translations for the BMC 118, boot times may increase, adding about 10 seconds to the overall boot time.

In conventional systems, the BMC 118 not being able to write directly to the UEFI NVRAM 320 can be an issue. For example, during a power-off state, the BIOS ROM 116 is managed by the BMC 118, and the BMC 118 has to read and write access to portions of the BIOS ROM 116 that contains the UEFI NVRAM 320 region. However, since the BMC 118 is unable to decipher the format for UEFI variable structure and usage, the BMC 118 is unable to edit the UEFI NVRAM 320 region as needed. Also, the BMC 118 being unable to understand the UEFI NVRAM 320 region of the BIOS ROM 116 means that when the UEFI NVRAM 320 region becomes corrupted, in order to recover this region of the BIOS ROM 116, the entirety of the BIOS ROM 116 must be updated. Rendering the BIOS ROM 116 out of service because only the UEFI NVRAM 320 region was corrupted is inefficient and can increase downtime of the computing system.

Some industrial standards, such as Redfish, alternatively introduce a network interface card (NIC) as a host interface. Alternatively, using the NIC as host interface is faster than KCS. However, synchronizing system configuration and inventory on each booting session is still verbose and requires communication and translations between the BIOS 304 and the BMC 118. For example, Redfish is only available after system memory (e.g., the RAM 110 of FIG. 1) has initialized and is in a ready state. Some chipset settings (e.g., settings of the southbridge 204 of FIGS. 2A, 2B) may need to be referred before memory initialization, since these chipset settings are memory and/or chipset parameters. Therefore, after completing the synchronization of system configuration and inventory, the computing system will need to perform a reboot to apply the new settings. The need for a reboot increases boot time of the computing system and/or decreases performance of the OS 302 during runtime.

Figure 5:
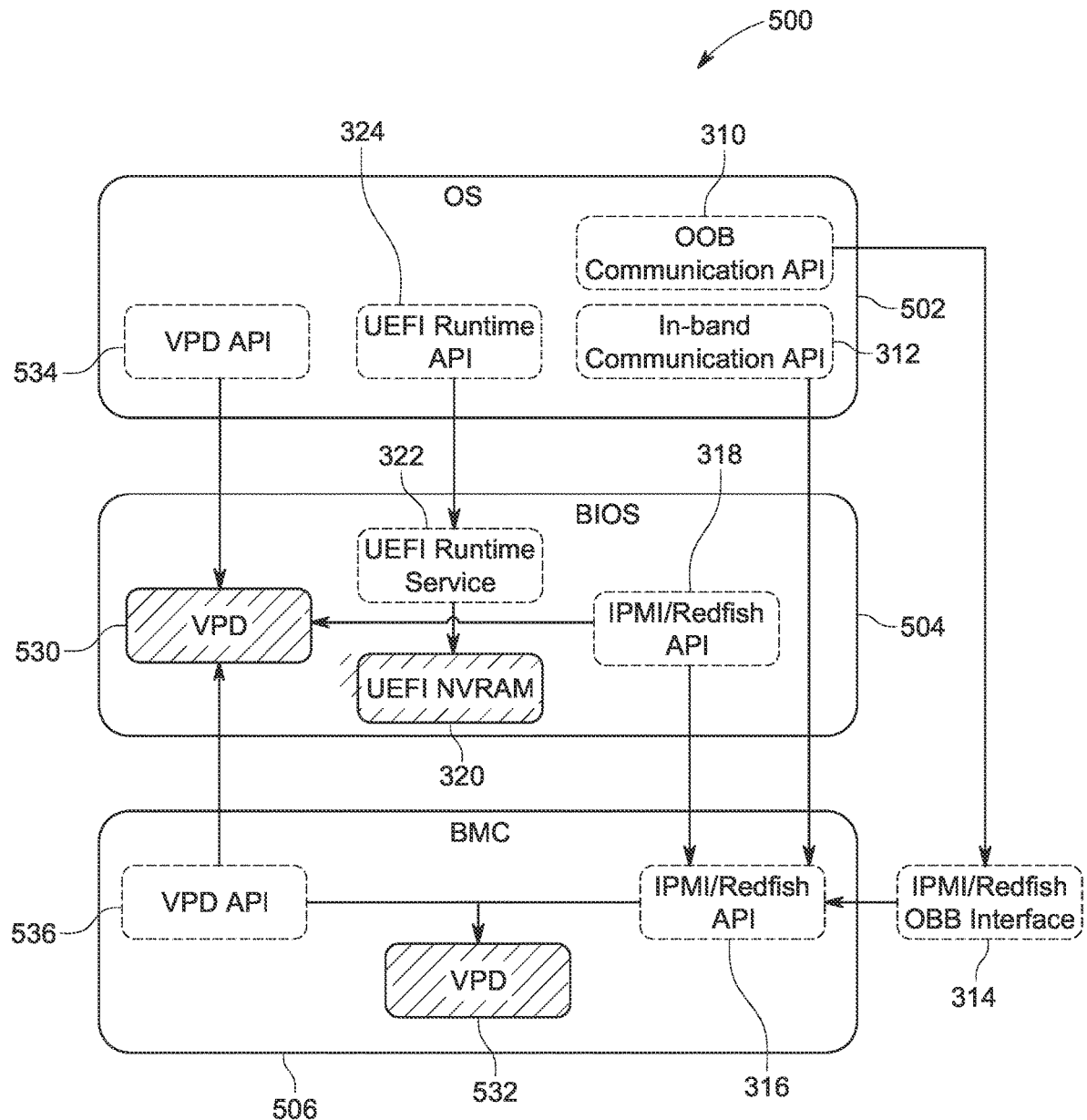
FIG. 5 is a block diagram illustrating an application layer architecture for a computing system, according to certain aspects of the present disclosure.

Embodiments of the present disclosure adopt string-driven open standard interfaces such as vital product data (VPD) and/or JavaScript Object Notation (JSON) to store system configuration and inventory in standard human-readable format. FIG. 5 is a block diagram illustrating an application layer architecture 500 of a computing system (e.g., the computing system 100), according to certain aspects of the present disclosure. FIG. 5 further illustrates APIs that enable communication between components of the application layer architecture 500. The application layer architecture 500 includes an OS 502, a BIOS 504, and a BMC 506.

The OS 502, the BIOS 504, and the BMC 506 are programs running on the processor 102 and the BMC 118. These are different from the counterparts in FIGS. 3 and 4 in that the BIOS 504 uses a VPD 530 and the BMC uses a VPD 532, and both the BMC 506 and the OS 502 include a VPD API 536 and a VPD API 534, respectively, to directly access the VPD 530 of the BIOS 504. By using the VPD 530 and the VPD 532, the interface and format are open standard, and both the BIOS 504 and the BMC 506 can use the same semantics to get, set, and share information without having to bounce information back and forth as in the application layer architecture 300 of FIGS. 3 and 4. VPD is merely used here as an example, but other open formats may be used. In an example, an open firmware coreboot can read the following VPD entries to configure IPMI fault resilient booting (FRB) level 2.

VPD Example Entry for Configuring IPMI FRB2 Parameters

```
"coreboot_options": {
    "frb2_countdown": "9000",
    "frb2_action"; "( )"
}
```

As shown in FIG. 5, the introduction of the VPD 530 and the VPD 532 is not intended to replace original communication interfaces between the BIOS 504 and the BMC 506. Use of IPMI or Redfish via the IPMI/Redfish APIs 316, 318 to communicate is still possible. The VPD API 536 allowing direct access to the VPD 530 of the BIOS 504 can minimize communication between the BIOS 504 and the BMC 506 during each boot session. This minimization in communication can be noticeable, especially if system settings, configuration, and inventory do not change between a previous boot session and a current boot session. If changes occur between boot sessions, the BMC 506 merely needs to retrieve modified system settings, configuration, and inventories that have been modified. As such, the application layer architecture 500 can decrease boot time compared to the application layer architecture 300.

The application layer architecture 500 provides communication advantages when compared to the application layer architecture 300 of FIGS. 3 and 4. The application layer architecture 500 uses the same open standard interface (e.g., VPD) for the BIOS 504 and the BMC 506 to store system configuration and inventory. The system configuration and inventory can be stored in the VPD 530 so that the VPD 530 is shared between the BIOS 504 and the BMC 506. The VPD 530 can reside on the BIOS ROM 116 (FIG. 1), thus allowing the BMC 118 (FIG. 1) to directly write to the BIOS ROM 116. From an application layer perspective, the BMC 506 program directly accessing the VPD 530 region of the BIOS ROM 116 limits or eliminates unnecessary communication between the BIOS 504 and the BMC 506 via IPMI/Redfish APIs 316, 318. Since the VPD 530 can include settings deployed by the BMC 506, the BIOS 504 can merely read the deployed settings from the VPD 530 and configure the computing system 100 (FIG. 1) accordingly without having to perform a reboot.

In a similar manner, when a user modifies any system settings remotely, the BMC 506 can update these settings to the VPD 530 directly or can update these settings to the VPD 530 when the computing system 100 (FIG. 1) is in a power-off state. After reboot, the BIOS 504 can use the newest settings in the VPD 530 to configure the computing system 100 (FIG. 1). Additionally, the BMC 506 can read system inventory directly from the VPD 530 without having to go through a communication interface such as KCS.

In another advantage, the VPD 532 can reside on the BMC ROM 120 (FIG. 1). The VPD 532 can be used as a backup storage for some or all of the contents in the VPD 530. That way, when the VPD 530 is corrupted (e.g., during a power drop while the VPD 530 is being written to), the VPD 530 can be recovered easily and quickly from the VPD 532. Although this is described in using the VPD 532 as backup, other implementations can use the VPD 530 to restore contents of the VPD 532 that have been corrupted.

As shown in FIG. 5, the VPD 530 and the VPD 532 do not replace the UEFI NVRAM 320 in some implementations. The VPD 530 is provided to enable storage sharing between the BIOS 504 and the BMC 506 so that the same semantics can be used for accessing system settings and configurations. Not replacing the UEFI NVRAM 320 can provide some legacy support. In some implementations, the UEFI NVRAM 320 is replaced by the VPD 530. For support, an ad-hoc parser can be provided for UEFI runtime service to decode the format between UEFI and VPD. When the BIOS 504 does not support UEFI, the UEFI runtime service and the UEFI NVRAM 320 are not necessary, and the VPD 530 can be used to achieve any functions attributed to the UEFI NVRAM 320.

Figure 6:
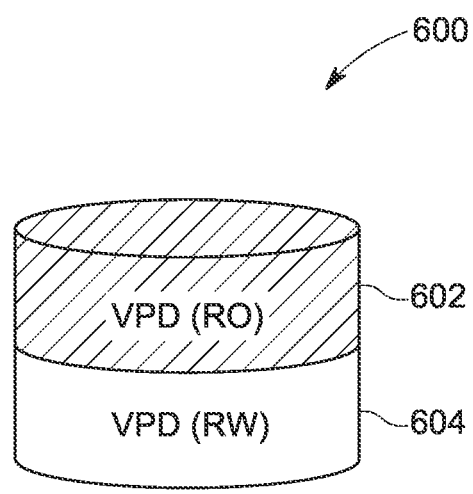
FIG. 6 illustrates regions of a vital product data (VPD), according to certain aspects of the present disclosure.

Referring to FIG. 6, regions of a VPD 600 are provided, according to certain aspects of the present disclosure. The VPD 600 is the same as or similar to the VPD 530 of FIG. 5 or the VPD 532 of FIG. 5. The discussion following will use the VPD 530 to discuss the regions indicated in FIG. 6. The VPD 530 can have a VPD read only (RO) region 602 and a VPD readable and writable (RW) region 604. The VPD RO region 602 stores static information that is not changeable by the BIOS 504 (FIG. 5). During compiling or producing configuration files for the BIOS ROM 116 (FIG. 1), a user can write some pre-configuration information such as BIOS version into the VPD RO region 602 but not during runtime. For runtime or power-off states, only the BMC 506 (FIG. 5) can modify the VPD RO region 602, and not the BIOS 504. For example, the BMC 506 can refer to hardware configuration in order to update stock keeping unit (SKU) information to facilitate the BIOS 504 performing platform initialization. Moreover, the BMC 506 may also store its settings in the VPD RO region 602 as a backup.

The VPD RW region 604 shares information (e.g., system configuration or inventory) between the BIOS 504 (FIG. 5)

and the BMC 506 (FIG. 5). Both the BIOS 504 and the BMC 506 can read or write to the VPD RW 604 and can synchronize with each other. Allowing both the BIOS 504 and the BMC 506 to use the VPD RW 604 in this manner prevents too much communication between the BIOS 504 and the BMC 506 on each boot. The VPD RW 604 is thus used for dynamic information that is shared and/or exchanged between the BIOS 504 and the BMC 506.

Figure 7:
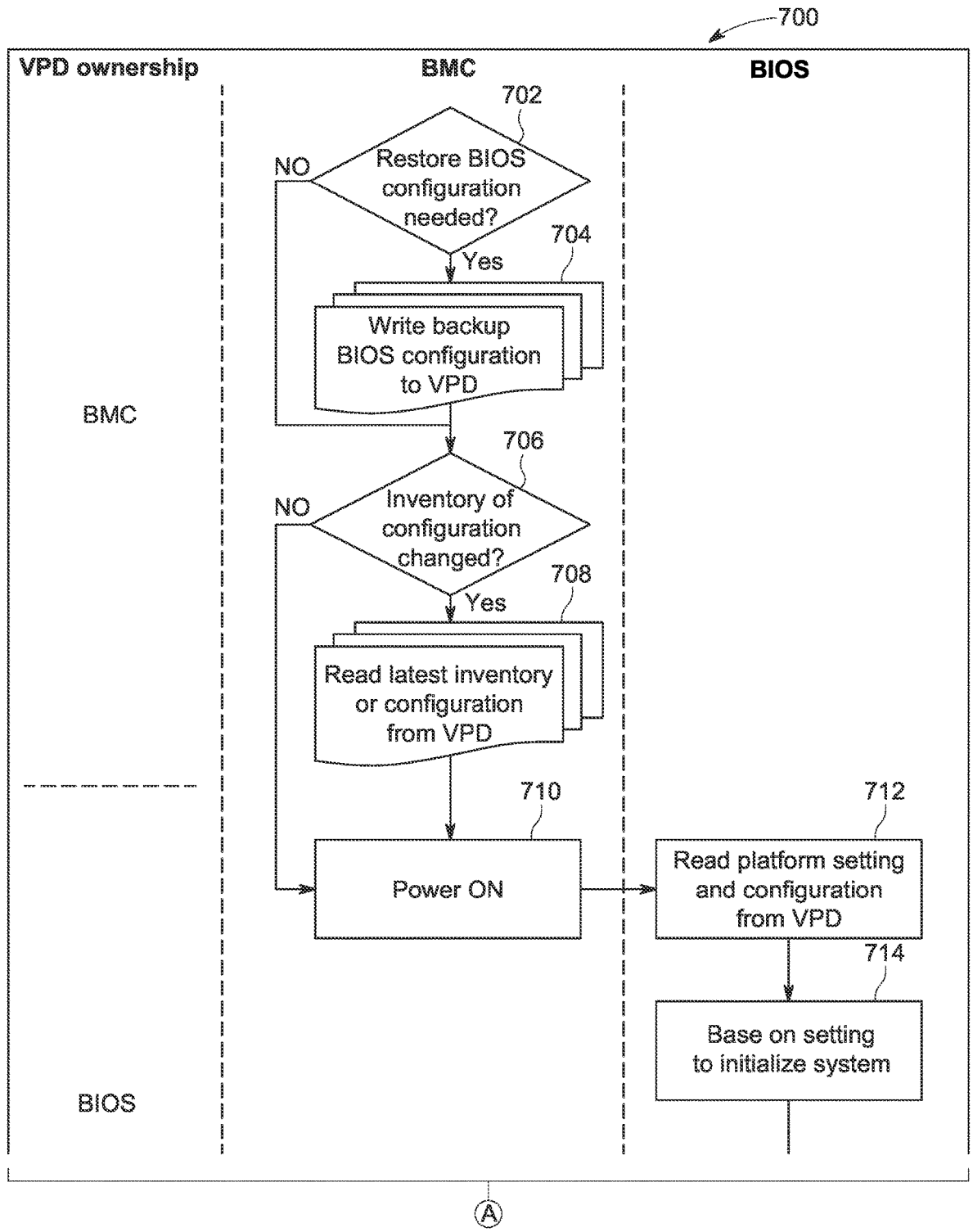
FIG. 7 is a flow diagram for VPD ownership during a boot-time process, according to certain aspects of the present disclosure.

Referring to FIG. 7, a flow diagram illustrating VPD ownership during a boot-time process 700 is provided, according to certain aspects of the present disclosure. The application layer architecture 500 of FIG. 5 will be used in describing the process 700. Prior to powering on the computing system 100 (i.e., step 710), the BMC 506 owns the VPD 530 and can make changes to the VPD 530 as needed. At step 702, the BMC 506 determines whether restoring BIOS configuration is necessary. For example, if the BIOS configuration stored in the VPD 530 became corrupted, then restoring the BIOS configuration would be required, and step 704 performed. Step 704 involves writing backup BIOS configuration to the VPD 530. In some implementations, as discussed above, the VPD 532 can include backup settings for restoring any data on the VPD 530 that may have been corrupted.

If at step 702, restoring BIOS configuration is unnecessary, then at step 706, the BMC 506 determines whether system inventory and setup configurations have changed. The BMC 506 reads the system inventory and setup options from the VPD RW region 604. From a remote access perspective, a user can access information on system inventory such as CPU information, memory information, PCIe information, etc. If remote configuration is supported, then the BMC 506 can obtain setup options from the VPD 530. The user can obtain the setup options and then configure the setup options remotely via the BMC 506. When configured for remote access mode, the BMC 506 has auxiliary power and access to a network interface (e.g., a network interface card) so that the BMC 506 can be probed for remote management by the user. At step 706, if the system inventory and/or setup options have changed, then at step 708, the BMC 506 reads the latest system inventory or configuration from the VPD 530 before powering on the computing system 100 (FIG. 1) at step 710.

The BMC 506 may also write the latest system configuration into the VPD RO 602 for the BIOS 504 at step 708, so the BIOS 504 can use the latest system configuration for platform configuration. In an example, VPD RO 602 entry for PCIe bifurcation is provided below.

VPD RO Example Entries for BIOS to Perform Platform Initialization

```
"pcie_bifurcation": {
    "cpu 0 port 0": "x4x4x4x4",
    "cpu 0 port 1": "x16",
    "cpu 0 port 2": "x8x4x4"
}
```

In the example above, CPU 0 (e.g., the CPU 202 of FIGS. 2A and 2B) provides multiple PCIe root ports such as port 0, 1, 2, etc. Each PCIe root port can implement 16 lanes but is not limited to only 16 lanes. Each PCIe root port can be configured as four x4 for connecting to 4 PCIe devices with x4 lanes, one x16 for connecting one PCIe device with 16 lanes, and one x8 and two x4 for connecting PCIe devices with x8 and x4 lanes.

In another example, since platform settings and configurations can also be configured through in-band or out-of-band communication (e.g., through in-band communication API 312, and OOB communication API 310), the BMC 506 can write some system configurations from in-band and/or out-of-band communications to the VPD RW 604 region of the VPD 530. That way, both the OS 502 and the BMC 506 can allow remote users or local users to modify these system configurations. The following provides an example of user-level options that can be configured using in-band and/or out-of-band communications.

VPD RW Entry for Coreboot to Configure Respective Options

```
"coreboot_options": {
    "coreboot_log level": "7"
    "intel_fsp_log_enable": "0",
    "coreboot_console_io_port": "0x2f8"
}
```

In the example above, the "coreboot_options" can be written to the VPD RW 604 portion of the VPD 530. The "coreboot_log_level" option describes the log level used during booting. The higher the value of the "coreboot_log_level" option, the more detailed the recorded or printed logs. The "intel_fsp_log_enable" taking on a Boolean value of "0" indicates that printing logs from Intel firmware support package (FSP) is disabled, so there are no FSP-related log showings during booting. The "coreboot_console_io_port" address is designated as "0x2f8" indicating that the UART I/O port address used here is 0x2f8 and boot logs may only output from this specific port address.

A VPD RW 604 entry can be used to specify a specific local disk for booting. Since a user can specify options for booting from a specific local disk, an example VPD RW 604 entry for u-root to configure booter configuration is provided below.

VPD RW Example Entry for U-Root to Configure Booter Configuration to Boot from a Specific Local Disk

```
"Boot0001": {
    "type": "localboot",
    "method": "path",
    "device_guid": "16145385-d435-4677-b733-009b73d1de71",
    "kernel": "/vmlinuz-4.18.0-305.3.1.el8.x86_64",
    "kernel_args":
    "root=UUID=0b68b3b6-f691-4903-aa38-bb4c528293d3 console=tty0 console=tty50,57600n8",
    "ramfs": "/initramfs-4.18.0-305.3.1.el8.x86_64.img"
}
```

In the example above, "Boot0001" indicates a first boot option that the computing system (e.g., the computing system 100) can be use in booting the OS. If there is an information mismatch in "Boot0001" with the boot device, the computing system will search for "Boot0002", "Boot0003", etc., until information matching the boot device is happened upon. Then the computing system will boot into the OS. The "type" attribute indicates whether to boot from a local disk or from a NIC or remote disk. The "method" attribute describes how to interpret the attributes that follow, with "path" indicating that values provided point to addressable file-system locations. The "device_guid" is a globally unique identifier (GUID) used to identify user accounts, documents, software, hardware, software interfaces, sessions, database keys, etc. In this context, the "device_guid" identifies the specific storage to boot from. The "kernel" attribute indicates the location of the kernel. The "kernel_args" attribute describes parameters for use with the identified kernel. In this example, the "root" parameter identifies a universally unique identification (UUID) that indicates the root directory. The "console" parameter can have multiple options based on which one is supported, for example, "tty0" or "ttyS0,57600n8.". "console" can be used repeatedly but can only be used once for each technology. For example, tty is virtual terminal, and ttyS is serial port, so "console=tty0 console=ttyS0" is acceptable but "console=ttyS0 console=ttyS1" is not acceptable. The "ramfs" attribute indicates the file system location to use for the specific boot (i.e., "Boot0001"). As these booter configurations can be user defined, the VPD RW 604 is a proper location for writing these options so that the BMC 506 and the BIOS 504 can easily access most recent booter configurations.

In another example, a VPD RW 604 entry can be made for a Redfish-aware BIOS (e.g., the BIOS 504) to configure its boot priority settings. The boot priority settings describe an order of locations to search for a bootable operating system. An example entry in the VPD RW 604 for boot priority settings is provided below.

VPD RW Example Entry for Redfish-Aware BIOS to Configure Boot Priority Options

```
"Boot": {
    "BootSourceOverrideEnabled": "Once",
    "BootSourceOverrideMode"; "UEFI",
    "BootSourceOverrideTarget": "Pxe",
    "BootSourceOverrideTarget@Redfish.AllowableValues": [
    "None",
    "Pxe",
    "Floppy",
    "Cd",
    "Usb",
    "Hdd",
    "BiosSetup",
    "Utilities",
    "Diags",
    "UefiTarget",
    "SDCard",
    "UefiHttp",
    "UefiBootNext"
    ],
    "UefiTargetBootSourceOverride": ""
},
```

In the above example, the "BootSourceOverrideEnabled" attribute set to "Once" describes that the boot source will be applied only once or externally. The "BootSourceOverrideEnabled" attribute can be set as Disable, Once or Continuous. The "BootSourceOverrideMode" attribute describes the mode of the target OS that the user wants to boot. "BootSourceOverrideMode" can take on two values, "UEFI" or "Legacy". The "BootSourceOverrideTarget" attribute describes the boot device where the target OS is stored. The "BootSourceOverrideTarget@Redfish.Allow-ableValues" attribute describes values that the "BootSourceOverrideTarget" parameter can be changed to using Redfish.

The previous examples illustrate dynamic options that can be set by the OS 502 and/or a remote user. These options can be written to the VPD 530 in the VPD RW 604 region so that the BMC 506 and the BIOS 504 are able to access these settings during boot-time without the need for excessive communication and translations between the BIOS 504 and the BMC 506.

After the computing system 100 is powered on at step 710, at step 712, the BIOS 504 reads platform settings and configurations from the VPD 530. Step 714 involves acquiring base on settings to initialize the computing system (e.g., the computing system 100). Base on settings are chipset-specific parameters such as frequency, power settings, core number, etc., for the BIOS 504 to perform CPU/Chipset/Memory initialization. During POST, the BIOS 504 reads CPU settings, memory settings, chipset settings, etc., from the VPD 530 and does a respective system initialization.

At step 716, if the system configuration and/or inventory has changed, then at step 718, the BIOS 504 updates system configuration and/or inventory to the VPD RW 604 region of the VPD 530. Since only the BMC 506 can write to the VPD RO 602 region, the BIOS 504 writes changes to system configuration and/or inventory to the VPD RW 604 region.

At step 720, the BIOS 504 notifies the BMC of the updates performed in step 718. The BMC 506 acquires VPD ownership of the VPD 530 at step 724. Then at step 726, the BMC 506 obtains the latest system configuration and/or inventory from the VPD 530 before releasing VPD ownership to the BIOS 504 at step 728. At step 722, the BIOS 504 waits for the BMC 506 to perform steps 724, 726, and 728 before the BIOS 504 can then boot the OS 502 at step 730.

In an example, when the BIOS 504 notifies the BMC 506 that system inventory is updated, the BMC 506 obtains an "UpdatedInventory" VPD RW 604 entry to identify which system inventory is updated. The BMC 506 can then retrieve the updated values of the changed system inventory and then delete the "UpdatedInventory" VPD RW 604 entry from the VPD RW 604. Deleting the entry prevents the BMC 506 from performing the update process over and over again for entries that have already been updated. An example of an "UpdatedInventory" VPD RW 604 entry is provided below.

VPD RW Example Entry to Request the BMC Retrieve Processor, Memory, and Network Information Again

```
"updated_inventories": {
    "processor": "yes",
    "memory": "yes",
    "network": "yes"
}
```

The process 700 allows the BMC 506 to be able to perform platform telemetry and configure system settings remotely. In order to make sure that the BMC 506 always contains the latest information, if any inventory is changed, the BIOS 504 notifies the BMC 506 to retrieve updated values again. That is, step 720 is repeated. Once the BMC obtains the updated values, then the BMC releases VPD ownership if in-band access is needed for the OS 502. By being able to release VPD ownership, embodiments of the present disclosure provide examples for temporal ownership of the VPD 530.

The VPD RO 602 region is not writable for all in-band access. The BIOS 504 and the OS 502 cannot write to the VPD RO 602 region even when the BIOS 504 has unlocked VPD ownership. Only the VPD RW 604 region is writable. For a default policy, the VPD ownership can remain with the host (i.e., the BIOS 504) before booting the OS 502. Therefore, once the OS 502 is booted, then the VPD ownership still remains with the host. Therefore, the OS 502 can access the VPD 530 directly. An example VPD RO 602 entry to configure default VPD ownership to the host (i.e., the BIOS 504 and the OS 502) before booting the OS 502 is provided below.

VPD RO Example Entry to Configure VPD Ownership to the Host

```
"vpd_options": {
    "default_vpd_ownership": "host"
}
```

Figure 8:
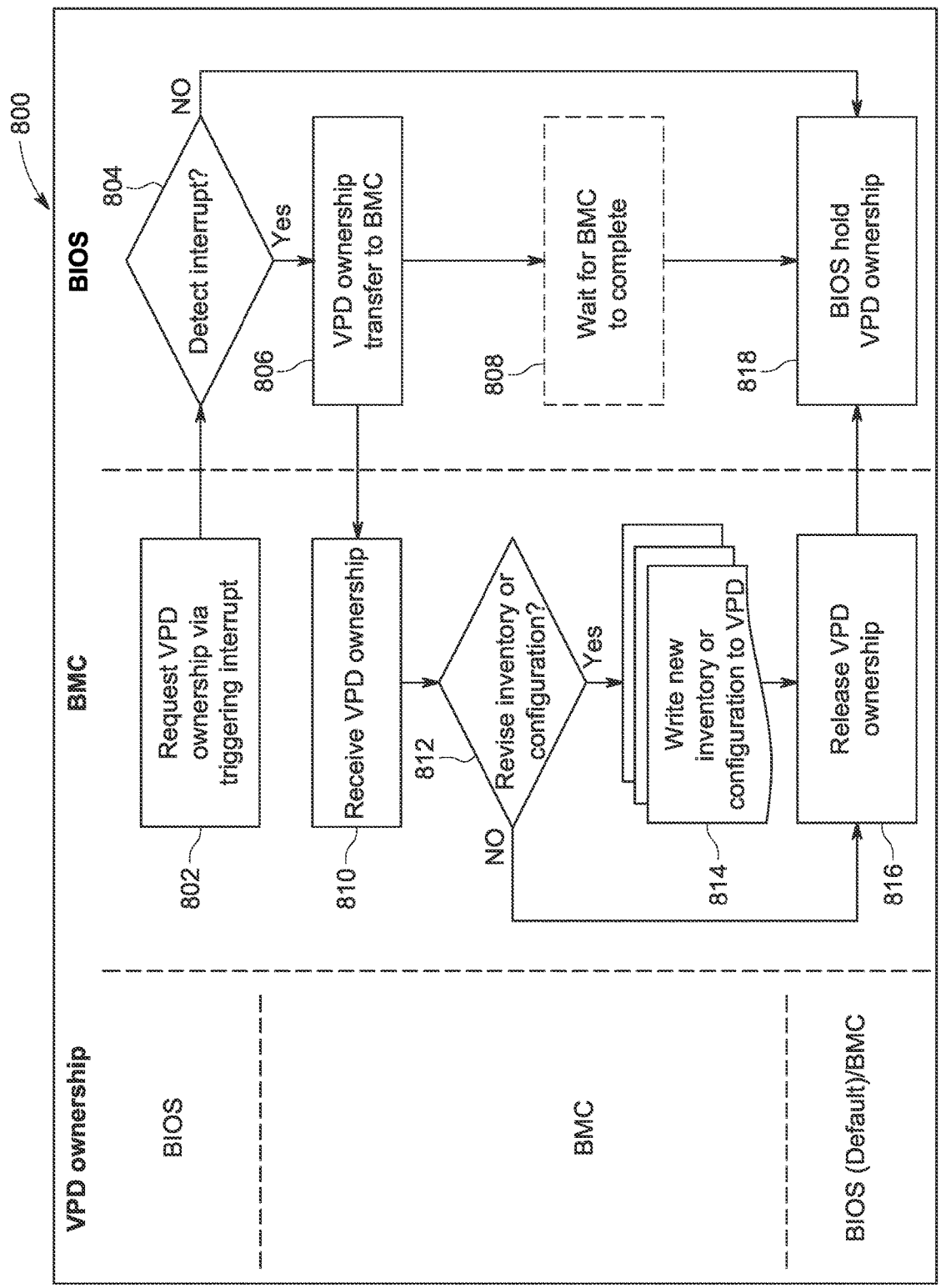
FIG. 8 is a flow diagram for a BMC to acquire VPD ownership during runtime, according to certain aspects of the present disclosure.

FIG. 8 is a flow diagram that illustrates a process 800 for the BMC 506 to acquire VPD ownership (e.g., ownership of the VPD 530 of FIG. 5) during runtime, according to certain aspects of the present disclosure. After booting into the OS 502, the default VPD ownership is set to the host, as discussed above. If the BMC 506 would like to access the VPD 530, then at step 802, the BMC 506 should trigger the system management interrupt (SMI) to acquire VPD ownership from the BIOS 504. In some implementations, the SMI is achieved via a general purpose input (GPI). From a systems perspective, the BMC is a passive device to be requested by host OS/BIOS and provide response. The GPI provides a mechanism for the BMC 506 to signal SMI to the BIOS 504, and then the BIOS 504 would query what kind of request is needed.

At step 804, if the BIOS 504 does not detect an interrupt, then the BIOS 504 holds the VPD ownership at step 818. Otherwise, if the interrupt is detected, then at step 806, the BIOS 504 transfers VPD ownership to the BMC 506 and waits at step 808 for the BMC 506 to release VPD ownership.

At step 810, the BMC 506 receives VPD ownership and performs tasks that warranted triggering the interrupt. That is, at step 812, the BMC 506 determines whether to revise system configuration and/or inventory. At step 814, the BMC 506 writes new system configuration and/or inventory to the VPD 530 and then releases the VPD ownership to the BIOS 504, at step 816.

Figure 9:
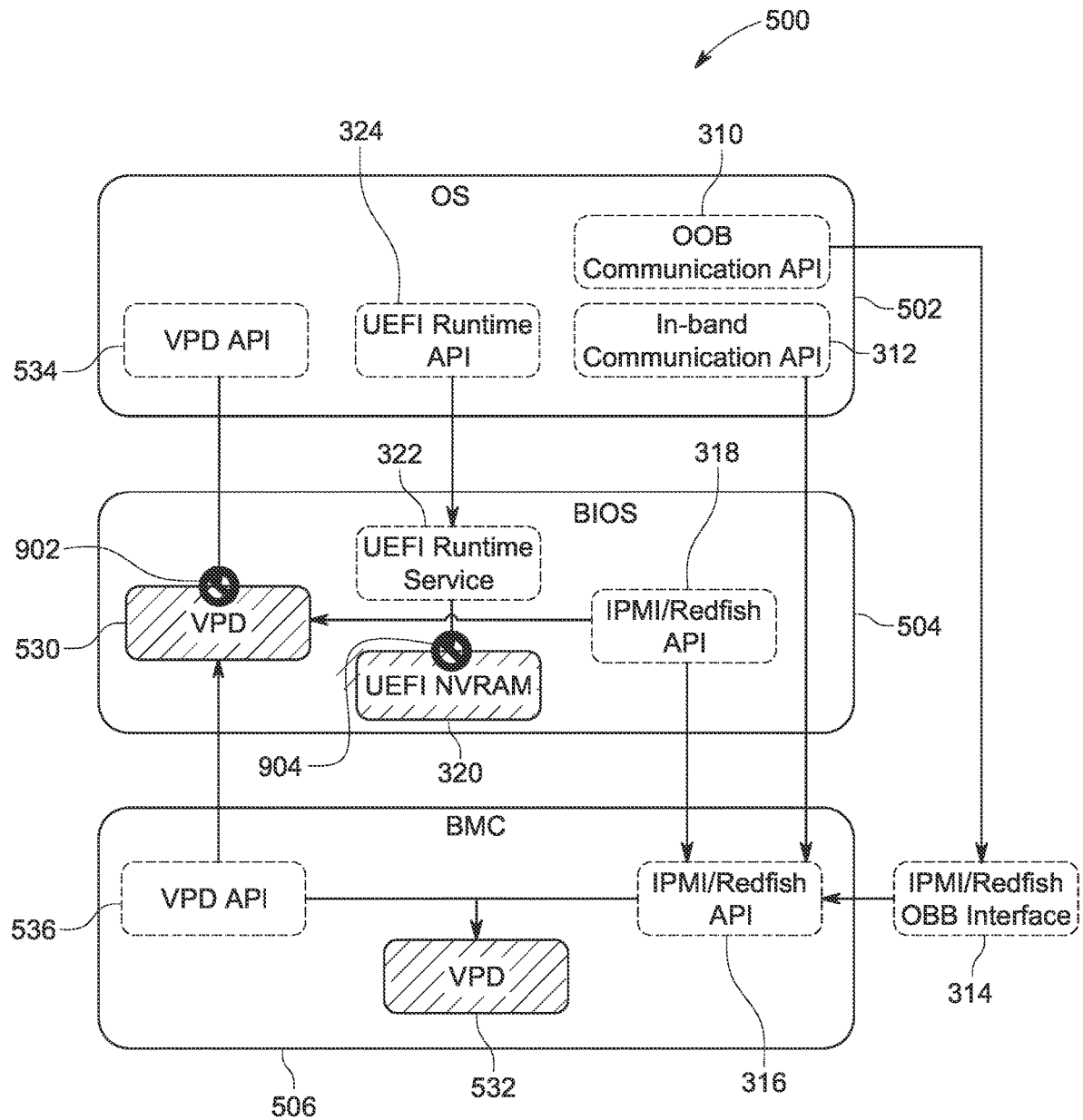
FIG. 9 is a block diagram illustrating the application layer architecture of FIG. 5 without in-band access to the VPD, according to certain aspects of the present disclosure.

In some implementations, the application layer architecture 500 of FIG. 5 allows a higher security configuration where in-band access of the BIOS ROM 116 (FIG. 1) is restricted. FIG. 9 is a block diagram illustrating the application layer architecture 500 without in-band access of the VPD 530 and the UEFI NVRAM 320 from the OS 502, according to certain aspects of the present disclosure.

For computing system or platform requires a higher security requirement or does not need to support in-band access from the OS 502, default VPD ownership can be set to the BMC 506 in order to block all in-band access after hand-off to the OS 502. The consequence of this change is that the VPD 530 becomes the BMC 506's secondary nonvolatile storage. Thus, only at boot-time does the VPD ownership belong to the BIOS 504. At other times (e.g., at runtime), VPD ownership belongs to the BMC 506. This default VPD ownership setup not only introduces a higher security but is also more flexible for the BMC 506. That is, the BMC 506 can utilize the VPD 530 directly without throwing an interrupt and asking the BIOS 504 to release VPD ownership during runtime. Since there is no communication between the BIOS 504 and the BMC 506 for exchanging VPD ownership, there is no performance loss for the OS 502.

In FIG. 9, the default VPD ownership remaining with the BMC 506 prevents the OS 502 from in-band access to the VPD 530 and/or the UEFI NVRAM 320. The indicators 902 and 904 show that the OS 502 does not have a direct path to these components. The OS 502 must rely on the in-band communication API 312 and the OOB communication API 310 to instruct the BMC 506 via IPMI and/or Redfish of any changes that should be made to the VPD 530.

Figure 10:
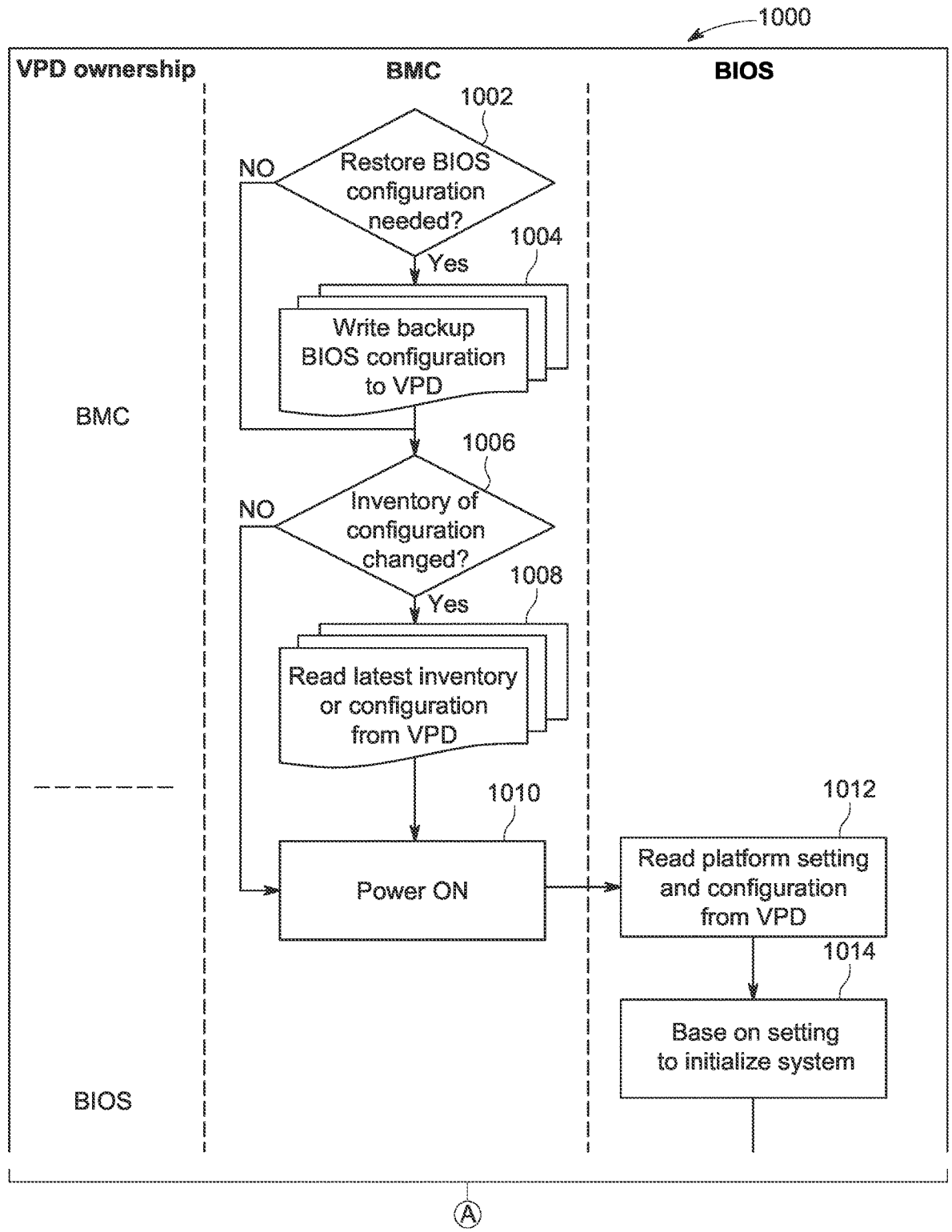
FIG. 10 is a flow diagram for VPD ownership without operating system access during boot-time, according to certain aspects of the present disclosure.

Referring to FIG. 10, a flow diagram illustrating VPD ownership during a boot-time process 1000 where the OS 502 is restricted from accessing the VPD 530 is provided, according to certain aspects of the present disclosure. At step 1002, the BMC 506 determines whether or not to restore BIOS configuration settings, and backup BIOS configuration settings are written to the VPD at step 1004. Steps 1002 and 1004 are analogous to the steps 702 (FIG. 7) and 704 (FIG. 7), respectively. The latest inventory configuration is ensured using steps 1006 and 1008 in a similar manner as described above in connection with steps 706 (FIG. 7) and 708 (FIG. 7).

At step 1010, the power of the computing system 100 (FIG. 1) is turned on. At step 1012, the BIOS 504 reads platform settings and configurations from the VPD 530 in a similar manner as described above in connection with step 712 (FIG. 7). At step 1014, the BIOS 504 then initializes the computing system 100 (FIG. 1) in a similar manner as described above in connection with step 714 (FIG. 7). The BIOS 504 then ensures the latest system configuration and/or inventory at steps 1016 and 1018 in a similar manner as described above in connection with steps 716 (FIG. 7) and 718 (FIG. 7), respectively.

At step 1020, the BIOS 504 informs the BMC 506 of updates to the system configuration and/or inventory in a similar manner as described above in connection with step 720 of FIG. 7. The BIOS 504 then releases VPD ownership. Then at step 1022, the BIOS 504 proceeds to boot the OS 502.

At step 1024, the BMC 506 acquires VPD ownership from the BIOS 504. At step 1026, the BMC 506 acquires the latest system configuration and/or inventory from the VPD 530 in a similar manner as described above in connection with step 726 of FIG. 7. At step 1028, the BMC 506 retains VPD ownership of the VPD 530 since the default VPD ownership has been set as the BMC 506. An example for setting the BMC 506 as the default VPD owner is provided below.

VPD RO Example Entry to Configure VPD Ownership to the BMC Prior to Booting the OS

```
vpd_options": {
    "default_vpd_ownership": "bmc"
}
```

After booting into the OS 502, the default VPD ownership is BMC 506. From a hardware perspective, the BIOS ROM 116 (FIG. 1) is routed to the BMC 506 and disconnected from the host (or BIOS 504). At runtime, the BIOS 504 can use SMI to access the VPD 530 if needed and rely on traditional IPMI or Redfish interface to request the BMC 506 access the VPD 530 as needed.

Figure 11:
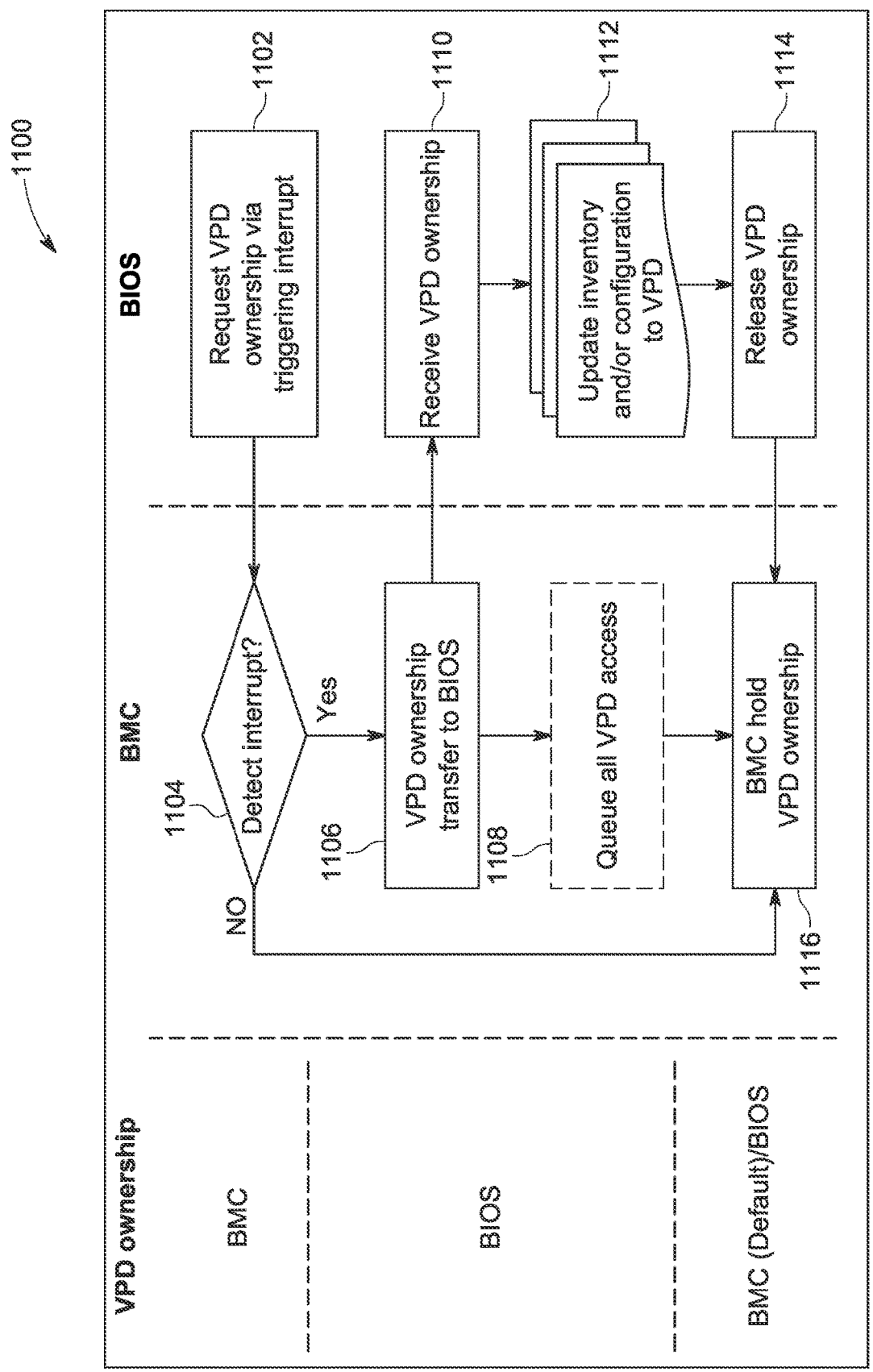
FIG. 11 is a flow diagram for the basic input/output system (BIOS) to acquire VPD ownership during runtime, according to certain aspects of the present disclosure.

In some implementations, the option of having the BIOS 504 acquire VPD ownership is kept intact. That is, the BIOS 504 can trigger an interrupt to the BMC 506 to acquire VPD ownership. Even with this option still available, the traditional IPMI interface is suggested in order to maintain the higher security configuration. FIG. 11 is a flow diagram illustrating a process 1100 for the BIOS 504 to acquire VPD ownership during runtime, according to certain aspects of the present disclosure. At step 1102, the BIOS 504 requests VPD ownership via the interrupt. If the interrupt is detected at step 1104 by the BMC 506, the BMC 506 transfers ownership to the BIOS at step 1106. Otherwise, the BMC holds VPD ownership at step 1116.

At step 1108 the BMC 506 queues all VPD access requests. When VPD ownership is transferred to the BIOS 504 in runtime, in some instances, the user and/or the BMC 506 may also want to change settings in the VPD 530 at the same time. In this case, the BMC 506 queues these requests firstly, and once VPD ownership changes back to the BMC 506, the BMC 506 then updates any requested change settings into the VPD 530.

At step 1110, the BIOS 504 receives VPD ownership. At step 1112, the BIOS 504 updates system configuration and/or inventory to the VPD 530. Once the BIOS 504 is completed with its use of the VPD 530, then at step 1114, the BIOS 504 releases VPD ownership of the VPD 530 to the BMC 506.

The application layer architecture 500 of FIG. 5 provides several advantages as described above. Having the VPD 530 minimizes communication between the BIOS 504 and the BMC 506 during boot-time, thus speeding up the booting process for the computing system 100 (FIG. 1). The application layer architecture 500 also provides the VPD 532, which can be used as a local storage for the BMC 506. The BMC 506 may use the VPD 532 as a backup or a source to restore configuration of the BIOS 504 in order to maintain user settings if the BIOS ROM 116 has been erased. For example, after the BIOS 504 is updated and the VPD RW 604 is erased, the BIOS 504 can set VPD entry "restore_bios_configuration" as a semaphore. After reboot, when the BMC detects such VPD entry, the BMC copies its backup copy of the BIOS configuration from the VPD 532 into the VPD RW 604 of the VPD 530 and then deletes the semaphore. An example VPD RW 604 entry to request the BMC 506 restore BIOS configuration from backup is provided below.

VPD RW Example Entry to Request BMC Restore BIOS Configuration from Backup

```
vpd_options": {
   "restore_bios_configuration": "yes"
}
```

In another example, in the event information in the VPD 530 is corrupted, the application layer architecture 500 also allows use of IPMI command to request the BMC 506 load default configuration into the VPD 530. The default configuration can be loaded without flashing the whole BIOS ROM 116 (FIG. 1).

Moreover, the BMC 506 can also store any settings in the VPD RO 602 of the VPD 530 as backup. This backup can come in handy in the event that the BMC ROM 120 (FIG. 1), where the VPD 532 may be stored, is erased or entirely formatted. The BMC 506 can retrieve its saved configuration from the VPD RO 602 of the VPD 530 and restore the configuration accordingly to maintain accumulated user settings.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A computing system comprising:
    a central processing unit (CPU) configured to run a basic input/output system (BIOS) service and an operating system (OS);
    a baseboard management controller (BMC); and
    a first boot non-volatile memory coupled to both the CPU and the BMC, a first portion of the first boot non-volatile memory storing system settings and a configuration in an open standard such that the BIOS and the BMC can access and modify the system settings and the configuration based on a temporal ownership of the first portion of the first boot non-volatile memory,
    wherein the temporal ownership prevents concurrent access and modification to the first portion of the first boot non-volatile memory and indicates which of the BIOS or the BMC can access and modify the first portion of the first boot non-volatile memory, and
    wherein the open standard enables
    (i) the BIOS to set and share the content of the stored system settings and configuration with the BMC using the same semantics as the BMC, and
    (ii) the BMC to set and share the content of the stored system settings and configuration with the BIOS using the same semantics as the BIOS.

2. The system of claim 1, further comprising:
    a multiplexer (MUX) coupled to the first boot non-volatile memory, the BMC, and the CPU, wherein the MUX receives a control signal from the BMC for switching access between the CPU and the BMC.

3. The system of claim 1, wherein the first boot non-volatile memory is a serial peripheral interface (SPI) flash.

4. The system of claim 1, wherein the BIOS is designated as a default owner of the first portion of the first boot non-volatile memory.

5. The system of claim 4, wherein the BMC requests ownership from the BIOS to access the first portion of the first boot non-volatile memory.

6. The system of claim 1, wherein the first portion of the first boot non-volatile memory includes a read-only portion and a readable-writable portion, both the read-only portion and the readable-writable portion being writable by the BMC during runtime, only the readable-writable portion being writable by the BIOS during runtime.

7. The system of claim 1, further comprising a second boot non-volatile memory coupled to the BMC, the second boot non-volatile memory storing backup system settings stored in the first portion of the first boot non-volatile memory.

8. The system of claim 1, wherein the open standard is vital product data (VPD) or JavaScript Object Notation (JSON).

9. The system of claim 1, wherein the BMC is designated as a default owner of the first portion of the first boot non-volatile memory.

10. The system of claim 9, wherein the OS does not have in-band access to the first portion of the first boot non-volatile memory.

11. The system of claim 9, wherein the OS relies on an intelligent platform management interface (IPMI) communication with the BMC to access the first boot non-volatile memory.

12. The system of claim 9, wherein the BIOS requests temporal ownership from the BMC to access the first portion of the first boot non-volatile memory.

13. A computer-implemented method, comprising:
booting a baseboard management controller (BMC) of a computing system using system settings from a first portion of a first boot non-volatile memory that are stored in an open standard, the first boot non-volatile memory being coupled to both the BMC and a central processing unit (CPU) of the computing system;
receiving, at the BMC, a power-on signal;
booting, by the CPU, a basic input/output system (BIOS) from the first portion of the first boot non-volatile memory;
notifying, by the BIOS, the BMC of any changes to the system settings stored on the first boot non-volatile memory; and
switching temporal ownership of the first portion of the first boot non-volatile memory from the BIOS to the BMC so that the BMC obtains the changes to the system settings in the open standard, the temporal ownership preventing concurrent access and modification to the first portion of the first boot non-volatile memory and indicating which of the BIOS or the BMC can access and modify the first portion of the first boot non-volatile memory,
wherein the open standard enables
(i) the BIOS to set and share the content of the stored system settings and configuration with the BMC using the same semantics as the BMC, and
(ii) the BMC to set and share the content of the stored system settings and configuration with the BIOS using the same semantics as the BIOS.

14. The method according to claim 13, wherein the BMC provides a control signal to a multiplexer (MUX) coupled to the first boot non-volatile memory, the BMC, and the CPU, the control signal switching the temporal ownership of the first portion of the first boot non-volatile memory from the BIOS to the BMC.

15. The method according to claim 13, wherein the first boot non-volatile memory is a serial peripheral interface (SPI) flash.

16. The method according to claim 13, wherein the BIOS is designated as a default owner of the first portion of the first boot non-volatile memory.

17. The method according to claim 16, wherein the BMC requests ownership from the BIOS to access the first portion of the first boot non-volatile memory.

18. The method according to claim 13, further comprising booting, by the BIOS, an operating system (OS) of the computing system.

19. The method according to claim 18, wherein the OS is booted after the BMC releases the temporal ownership of the first boot non-volatile memory to the BIOS.

20. A computer-program product tangibly embodied in a non-transitory machine-readable storage medium, the computer-program product including instructions configured to cause a data processing apparatus to perform operations including:
booting a baseboard management controller (BMC) of a computing system using system settings from a first portion of a first boot non-volatile memory that are stored in an open standard, the first boot non-volatile memory being coupled to both the BMC and a central processing unit (CPU) of the computing system;
receiving, at the BMC, a power-on signal;
booting, by the CPU, a basic input/output system (BIOS) from the first portion of the first boot non-volatile memory;
notifying, by the BIOS, the BMC of any changes to the system settings stored on the first boot non-volatile memory; and
switching temporal ownership of the first portion of the first boot non-volatile memory from the BIOS to the BMC so that the BMC can obtain the changes to the system settings in the open standard, the temporal ownership preventing concurrent access and modification to the first portion of the first boot non-volatile memory and indicating which of the BIOS or the BMC can access and modify the first portion of the first boot non-volatile memory,
wherein the open standard enables
(i) the BIOS to set and share the content of the stored system settings and configuration with the BMC using the same semantics as the BMC, and
(ii) the BMC to set and share the content of the stored system settings and configuration with the BIOS using the same semantics as the BIOS.

21. A computing system comprising:
a central processing unit (CPU) configured to run a basic input/output system (BIOS) service and an operating system (OS);
a baseboard management controller (BMC); and
a first boot non-volatile memory coupled to both the CPU and the BMC, a first portion of the first boot non-volatile memory storing system settings and a configuration in an open standard such that the BIOS and the BMC can access the system settings based on a temporal ownership of the first portion of the first boot non-volatile memory,
wherein the first portion of the first boot non-volatile memory includes a read-only portion and a readable-writable portion, both the read-only portion and the readable-writable portion being writable by the BMC during runtime, only the readable-writable portion being writable by the BIOS during runtime.

* * * * *